United States Patent [19]

Mita

[11] Patent Number: 5,272,545
[45] Date of Patent: Dec. 21, 1993

[54] IMAGE SCANNER HAVING IMPROVED PIXEL CONVOLUTION OPERATION

[75] Inventor: Kikuo Mita, Kanagawa, Japan

[73] Assignee: Eastman Kodak Company, Rochester, N.Y.

[21] Appl. No.: 822,231

[22] Filed: Jan. 17, 1992

[30] Foreign Application Priority Data

Mar. 25, 1991 [JP] Japan .................. 3-060325

[51] Int. Cl.$^5$ .............................................. H04N 5/14
[52] U.S. Cl. ...................................... 358/464; 382/42
[58] Field of Search ............... 358/448, 451, 459, 460, 358/461, 471, 474, 445–447, 480, 486, 487, 464; 382/42

[56] References Cited

U.S. PATENT DOCUMENTS

| | | | |
|---|---|---|---|
| 4,532,548 | 7/1985 | Zwirn ................................ | 382/42 |
| 4,747,155 | 5/1988 | Dotson .............................. | 382/42 |
| 4,945,496 | 7/1990 | Kurakake et al. .................. | 358/464 |

Primary Examiner—Stephen Brinich
Attorney, Agent, or Firm—Raymond L. Owen

[57] ABSTRACT

An image scanner that can extract the information of interest from a document at high speed, using a relatively small-scale circuit arrangement that provides an image processing performance equal to that obtained by applying convolution to a larger number of pixels. Light reflecting from the document is converted to electrical image signals by a one-dimensional image sensor. After these image signals have been digitized by an A/D converter, they are input to an adder. A portion of the digitized signals is input to a rounding circuit in which the average intensity of a pixel unit, each comprised of a prescribed number of pixel groups, is calculated. These units are treated as pseudo pixels on which convolution is performed by a convolution integrator. A subtracter is then used to obtain the difference between signals input from the A/D converter and signals output by the convolution integrator. This is then used to obtain the difference between the intensity of the pixel of interest and the average intensity of the prescribed number of surrounding pixels to effectively distinguish alphanumeric characters and other such information, from the background.

12 Claims, 5 Drawing Sheets

IMAGE SCANNER HAVING IMPROVED PIXEL CONVOLUTION OPERATION

FIELD OF THE INVENTION

The present invention relates to a document image scanner, and more particularly, to an improved image scanner for extracting the target text and other pattern information without hindrance from the background brightness of the document.

DESCRIPTION OF THE PRIOR ART

Image scanners have come into widespread use as a data input means, but if their use is to increase further they have to be able to scan text and other pattern information with greater precision, speed and economic efficiency. To achieve this, with the exception of certain areas of application, such scanners now store, transmit and print the scanned information after it has been binarized.

However, the documents that have to be scanned are varied. In many cases the information may be written on dark-colored paper, or the documents contain extraneous background information such as discolored areas in the case of a copy of a document that has been copied many times. Thus, it is necessary for an image scanner to be not only able to scan a document image, but also to be able to accurately extract the target textual information or the like without being affected by background brightness or noise information.

Because of this, usually the image elements (pixels) are binarized by obtaining the difference between the brightness (intensity) of each pixel and the average intensity of the surrounding pixels, and the binarized data is then used to extract the requisite image data patterns from the background.

In the prior art, convolution is used to obtain the average intensity of the surrounding pixels. A prescribed number of pixels around the pixel of interest are selected and the product of each of these pixels and a window function is obtained, and the value produced by combining these products is then taken as the average intensity around the pixel of interest.

However, as shown by FIG. 1, applying convolution to just a small number of pixels in a small area emphasizes background noise, preventing the image pattern information of interest being extracted with adequate effectiveness. To enable the object information patterns to be effectively extracted, it is necessary to apply convolution to a larger expanse, for example forty or more pixels. As shown by FIG. 2, applying convolution to such a number of pixels makes it possible to suppress background noise and emphasize the patterns of interest on the document.

Unfortunately, the large numbers of multipliers and adders required to perform convolution with a large number of pixels makes the system large and complex, increasing the cost and making it difficult to attain high operating speeds.

SUMMARY OF THE INVENTION

An object of the present invention is therefore to provide an image scanner that is able to efficiently extract textual and other information of interest on a document at high speed with a relatively simple circuit arrangement that provides an image processing performance equal to that obtained by applying convolution to a large number of pixels.

In accordance with the present invention, this and other objects are attained by an image scanner comprising:

an image sensor for receiving light reflected from or transmitted by a document and converting the light into a series of signals representing the light intensity for a plurality of image pixels;

a rounder operatively connected to said image sensor for grouping respective signals for predetermined adjacent image pixels to form a predetermined series of pseudo pixels surrounding a predetermined image pixel and calculating an average light intensity value for each pseudo pixel;

a convolution integrator operatively connected to said rounder for performing convolution operations on the average light intensity value for each pseudo pixel and generating an output signal therefrom; and a subtracter operatively connected to said image sensor and said convolution integrator for calculating the difference between the output signal of the convolution integrator and the light intensity value of the predetermined image pixel.

Thus, in accordance with this invention, the pixels around the pixel of interest are divided into a number of groups, the average intensity of each group is obtained, and each group is regarded as a pseudo pixel for convolution purposes to thereby obtain the average intensity of the pixels surrounding the pixel of interest. This is then taken as the background intensity, and by then obtaining the difference between this background intensity and the intensity of the pixel of interest, the target text and other pattern information can be extracted.

Further features of the invention, its nature and various advantages will become more apparent from the accompanying drawings and following detailed description of the invention.

DETAILED DESCRIPTION OF THE PREFERRED EMBODIMENTS

Figure 3:
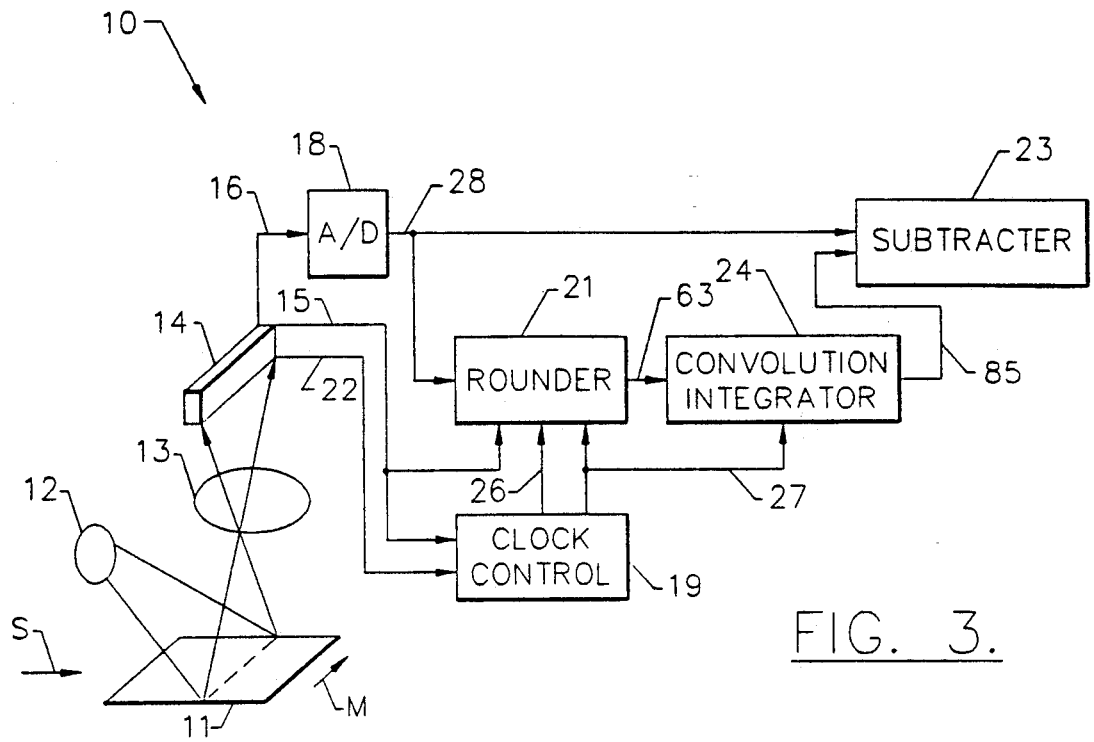
FIG. 3 is a schematic diagram of an image scanner according to the present invention.

FIG. 3 shows the principal parts of an embodiment of the image scanner 10 according to the present invention. In the scanner 10, a light source 12 illuminates a document 11 moving at a constant speed in a direction indicated by an arrow S. The pattern of alphanumeric characters and other information on the document 11 thus illuminated by the light source 12 is focussed by an optical system 13 including lenses, optical filters and the like, to thereby form the image on a one-dimensional image sensor 14 comprising a large number of small photosensors of a predetermined size. The one-dimensional image sensor 14 photosensors output on signal line 16 a stream of analog image signals corresponding to each respective pixel, in time with a pixel clock (VCLK) signal on line 15. The image signals are input to an analog/digital (A/D) converter 18. The generation of the image signals of each scanning line proceeds in the direction indicated by arrow M.

The pixel clock signal is provided to two lines that go to a clock control circuit 19 and a rounding circuit 21, respectfully. For each scanning line, the one-dimensional image sensor 14 outputs a line synch clock signal on line 22 to the clock control circuit 19. The output side of the A/D converter 18 is connected to the rounding circuit 21 and to a subtracter 23. The output side of the rounding circuit 21 is connected to the subtracter 23 via a convolution integrator 24.

The clock control circuit 19 supplies to the rounding circuit 21 a ¼-pixel clock signal on line 26 that is one-quarter the frequency of the pixel clock signal on line 15, and also supplies to the rounding circuit 21 and convolution integrator 24 a 1/16-pixel clock signal on line 27 produced by extending the ¼-pixel clock signal 26 over four scanning lines. Details of the waveforms of these clock signals are provided below.

The operation of the image scanner 10 thus configured will now be described. When the pattern of alphanumeric characters and other information on the document 11 thus illuminated by the light source 12 is focussed by the optical system 13 to form an image on the photosensors of the one-dimensional image sensor 14, the photosensors output a stream of image signals on line 16 that correspond to the intensity of the received light. On completion of the output of each line of image signals from the image sensors, the document 11 is moved by an amount corresponding to one line in the direction of the arrow S. The one line referred to here corresponds to the scanning resolution of the one-dimensional image sensor 14. This is repeated for the ensuing lines, with the one-dimensional image sensor's photosensors producing a stream of image signals corresponding to each of the pixels of the document 11.

The image signals on signal line 16 output by the one-dimensional image sensor 14 are converted to digital image signals on signal line 28 by the A/D converter 18, and are input to the subtracter 23 and rounding circuit 21. The clock control circuit 19 generates the ¼-pixel clock signal and the 1/16-pixel clock signal, from the pixel clock signal and line synch clock signal on signal line 22 output by the one-dimensional image sensor 14.

Figure 4:
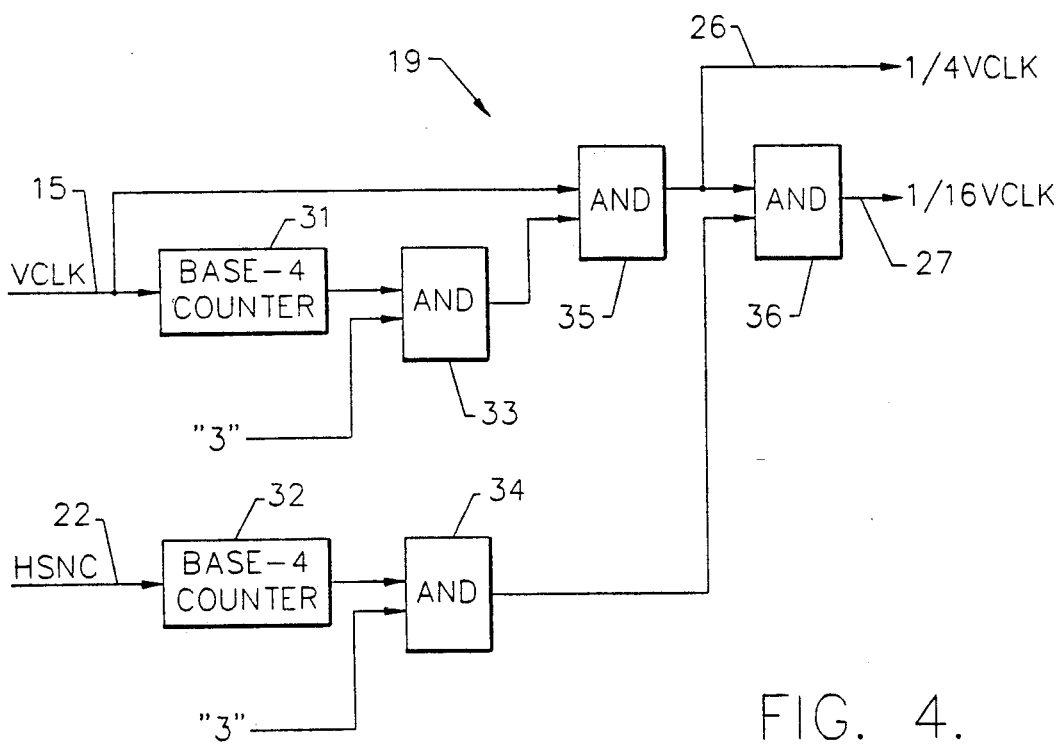
FIG. 4 is a schematic diagram showing details of the clock control circuit of the image scanner as shown in FIG. 3.
Figure 5:
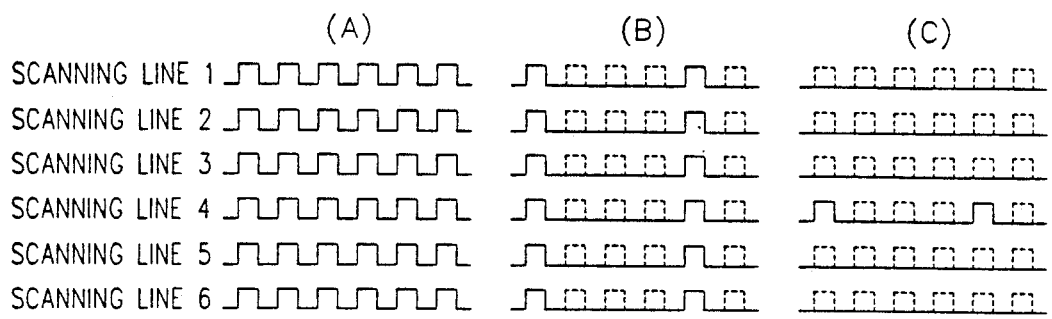
FIG. 5 is timing diagram of the clocks of the clock control circuit as shown in FIG. 4.

FIG. 4 shows details of the clock control circuit 19. This circuit is equipped with a pair of base-4 counters 31 and 32. The first base-4 counter 31 counts the pixel clock pulses (A) as shown in FIG. 5 and inputs the count value to a first AND circuit 33. The second base-4 counter 32 counts the line synch clock pulses and inputs the count value to a second AND circuit 34. A reference value "3" is input to this AND circuit 34, and when the count from each base-4 counter 31, 32 reaches this reference count "3", a High signal is applied to one of the input terminals of the third and forth AND circuits 35 and 36 respectively.

The pixel clock signal VCLK on line 15 connects to the other input terminal of the third AND circuit 35, and the output of the third AND circuit 35 goes to the other input of the forth AND circuit 36. As shown in FIG. 5, when the output of the first AND circuit 33 goes High, the gate of the third AND circuit 35 opens to output the ¼-pixel clock signal (B) that is one-quarter of the pixel clock frequency (A). When the output of the first AND circuit 34 goes High, the gate of the forth AND circuit 36 opens to output the ¼-pixel clock signal obtained by extending the ¼-pixel clock to every fourth scan line (C). The ¼-pixel clock signal is input to the rounding circuit 21, and the 1/16-pixel clock signal is input to the rounding circuit 21 and convolution integrator 24.

Figure 6:
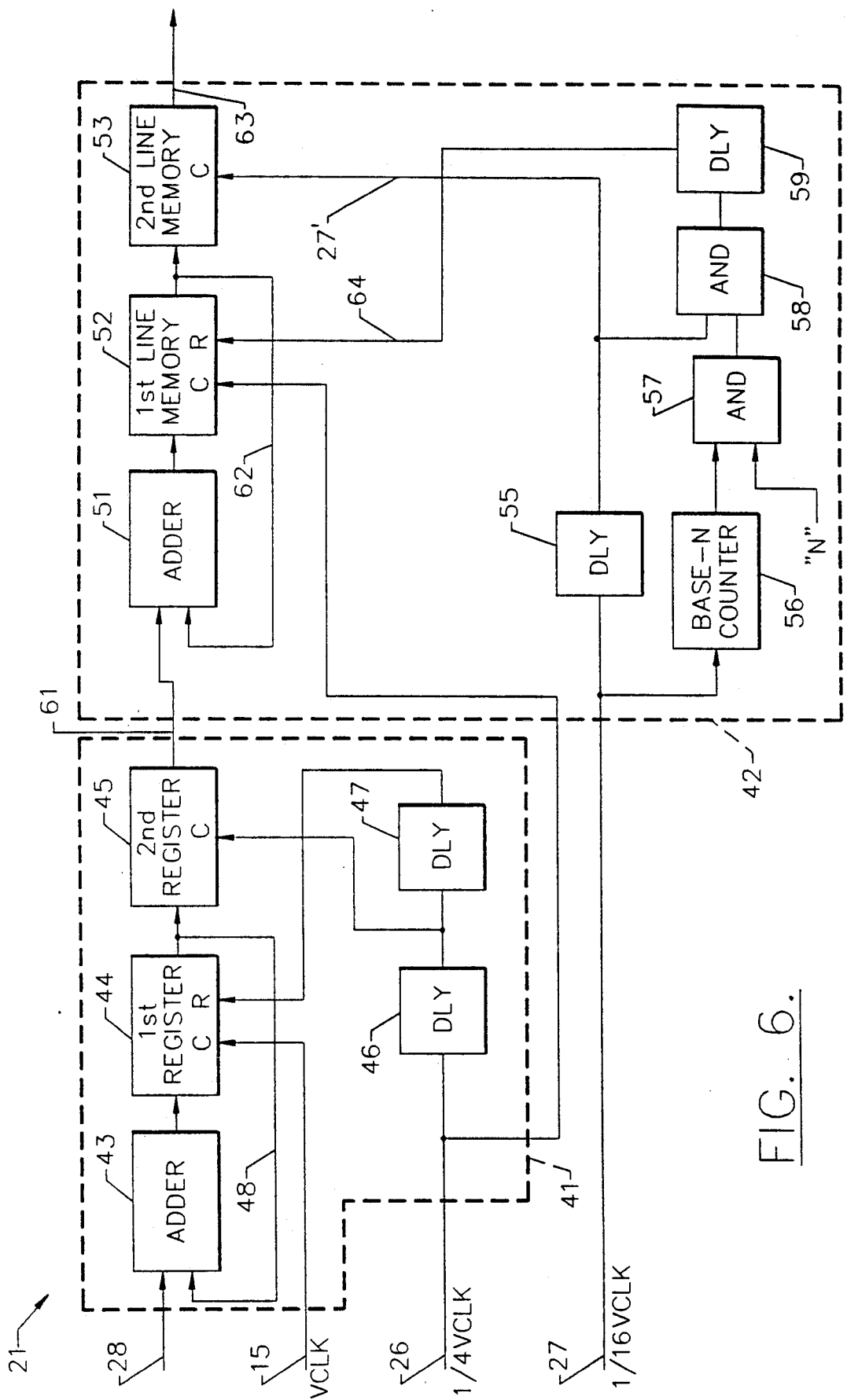
FIG. 6 is a schematic diagram showing details of the rounding circuit of the image scanner as shown in FIG. 3.

FIG. 6 shows details of the rounding circuit 21. This circuit is comprised of a 4-pixel totalling section 41 that produces a running pixel total every four pixels of a line, and a 4-line pixel totalling section 42 that uses the output of the 4-pixel totalling section 41 to produce a running total of the pixel count per four lines.

The image signals on signal line 28 digitized by the A/D converter 18 go to one of the input terminals of an adder 43 provided in the 4-pixel totalling section 41. The output side of the adder 43 is divided into two by means of a first register 44, and the other input terminal of the adder 43 and the input terminal of a second register 45 are connected. The output side of the second register 45 is connected to the 4-line pixel totalling section 42.

Also input to the 4-pixel totalling section 41 are the pixel clock signal from signal line 15 from the one-dimensional image sensor 14, which is input via clock terminal C of the first register 44, and the ¼-pixel clock signal from the clock control circuit 19, which is input to the delay circuit (DLY) 46. The ¼-pixel clock, which is divided, is also input to the 4-line pixel totalling section 42. The output side of the delay circuit 46 is divided, with one side being connected directly to the clock terminal C of the second register 45 and the other side being connected to the reset terminal R of the first register 44 via a delay circuit 47.

The 4-line pixel totalling section 42 is provided with an adder 51, one of the input terminals of which is connected with the output side of the second register 45 of the 4-pixel totalling section 41. The output side of the adder 51, divided by means of a first line memory 52, is connected to the other input terminal of adder 51 and to a second line memory 53. The ¼-pixel clock signal from the 4-pixel totalling section 41 is also input to the clock terminal C of the first line memory 52. Assuming that one primary scan by the one-dimensional image sensor 14 scans 4N pixels, the first and second line memories are able to hold the data of one-fourth that many pixels, i.e., N pixels.

The 1/16-pixel clock output by the clock control circuit 19 is input to the 4-line pixel totalling section 42. This 1/16-pixel clock 27 is divided, being input to a delay circuit 55 and a base-N counter 56. The divided output line of the delay circuit 55 is connected to clock terminal C of the second line memory 53 and to one of the input terminals of an AND circuit 58. The output side of the base-N counter 56 also is connected to one of the input terminals of the AND circuit 57. A reference value "N" is input to the other input terminal of the AND circuit 57. A High signal is output from the AND circuit 57 when the input from the base-N counter 56 matches the reference value "N". This signal is input to the other input terminal of AND circuit 58, the output of which is input, via a delay circuit 59, to the reset terminal R of the first line memory 52. The second line memory 53 outputs 4-line pixel total data 63.

The operation of the rounding circuit 21 as used in this arrangement will now be described. The image signal input from the A/D converter 18 in time with the pixel clock on signal line 15 is added to the first register 44 output by the adder 43. With the output on signal line 48 being "0" in the initial state, the image signal on signal line 28 input to the adder 43 is latched in the first register 44, using the pixel clock signal. The second image signal input at the next pixel clock signal pulse is added to the output of the first register 44 by the adder 43, and the result is latched in the first register 44, using the pixel clock signal. In the same way the third and fourth image signals are added and placed in the first register 44.

The ¼-pixel clock signal (FIG. 5 (B)) input from the clock control circuit 19 is given a prescribed time delay by the delay circuit 46 and applied to the clock input terminal C of the second register 45. At the input of each of these clock pulses, the image signal data total for four pixels (hereinafter also referred to as "4-pixel total data") stored in the first register 44 is read out and latched in the second register 45. Then, after the application of a set time delay by delay circuit 47, the first register 44 is reset to the initial state by the application of a clock to the reset terminal R of the first register 44.

Figure 7:
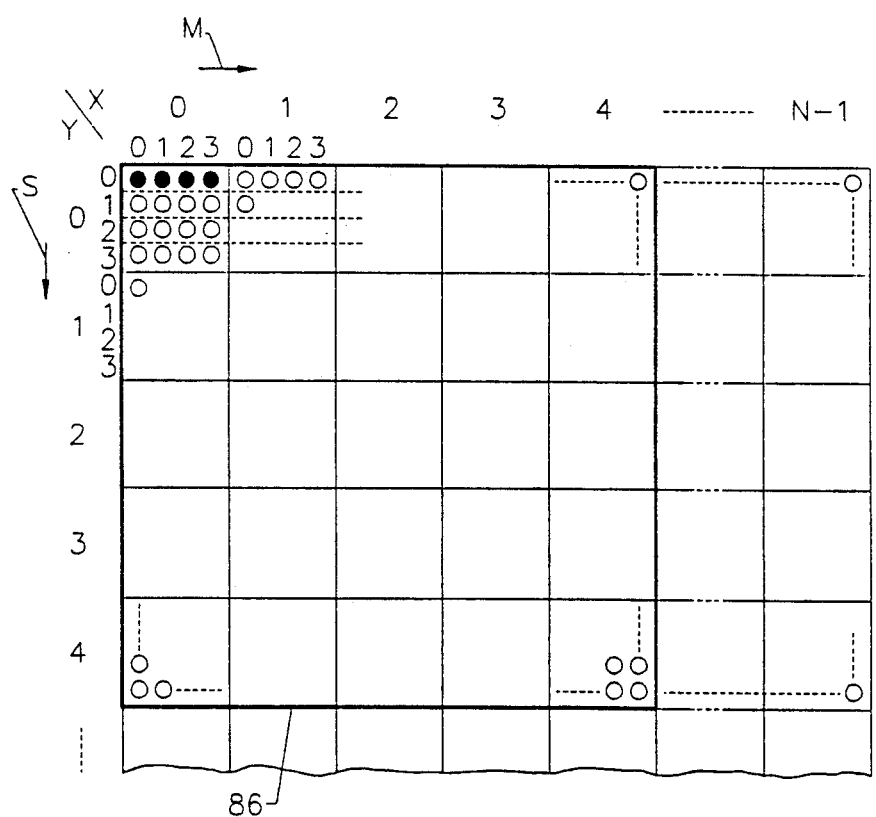
FIG. 7 is diagram showing the locations of pixels scanned from the document using the image scanner as shown in FIG. 3.

FIG. 7 shows pixels scanned by the one-dimensional image sensor 14. In the drawing, the circles represent individual pixels, with scanning proceeding sequentially in the primary scanning direction M and being repeated in the secondary scanning direction S. The image signal total for four pixels (X=0), for example, here represented by the solid black circles, is calculated by the 4-pixel totalling section 41, stored in the second register 45 and output to the 4-line pixel totalling section 42. This same procedure is applied for each group of four pixels, so that for one line of pixels (X=0 to N−1) 4-pixel total data for N pixels is produced.

The ¼-pixel clock signal on signal line 26 synchronizes the input of 4-pixel- total data on signal line 61 to the adder 51 of the 4-line pixel totalling section 42 and is added to the output on signal line 62 of the first line memory 52. In the initial state the contents of the addresses [0] to [N−1] of the first line memory 52 are each "0", so the output 62 is also "0". Therefore, the 4-pixel total data 61 input to the adder 51 is written into the first address [0] of the first line memory 52, at a timing provided by the ¼-pixel clock signal.

The second 4-pixel total data on signal line 61 (X=1 in FIG. 7) input at the next ¼-pixel clock pulse is added by the adder 51 to the "0" in the second address location of the first line memory 52. The same process is continued as the third to the N−1 items of 4-pixel total data are stored in the corresponding addresses of the first line memory 52. For the next primary scanning line, also, the 4-pixel total data information is input and combined with the information in the corresponding addresses of the first line memory 52.

When the accumulated pixel total data for the first to the fourth lines has thus been placed in the first line memory 52, the 1/16-pixel clock signal (FIG. 5 (C)) is given a set time delay by the delay circuit 55 and the resultant 1/16-pixel clock signal on signal line 27' is input to the clock terminal C of second line memory 53. As a result, the content of the first line memory 52 address [0] gets written into the corresponding address of the second line memory 53. The 4-line pixel total data that is written into memory at this point is the 16-pixel total of pixel group (X, Y)=(0, 0) of FIG. 7.

In the same way, total values for the sixteen pixels of each of the pixel groups (X, Y)=(1, 0) to (N−1, 0) in FIG. 7 are placed sequentially into second line memory 53 addresses [1] to [N−1] in accordance with the timing of the 1/16-pixel clock signal on signal line 27. When this has been completed, the contents of the first line memory 52 are reset by a reset signal output by the delay circuit 59 to prepare for the arrival of 4-line pixel total data of the next (X, Y)=(0, 1) pixel group.

The 4-line total data for N pixels thus stored in the second line memory 53 is then divided by the pixel total of sixteen per group by a divider (not shown) and the result is input to the convolution integrator 24. This division by sixteen is done by discarding the least-significant four bits of the 4-line pixel total data. The pixel data average for each of the 16-pixel groups of FIG. 7 (hereinafter referred to as the "16-pixel-average data") is thus obtained and input to the convolution integrator 24.

Figure 8:
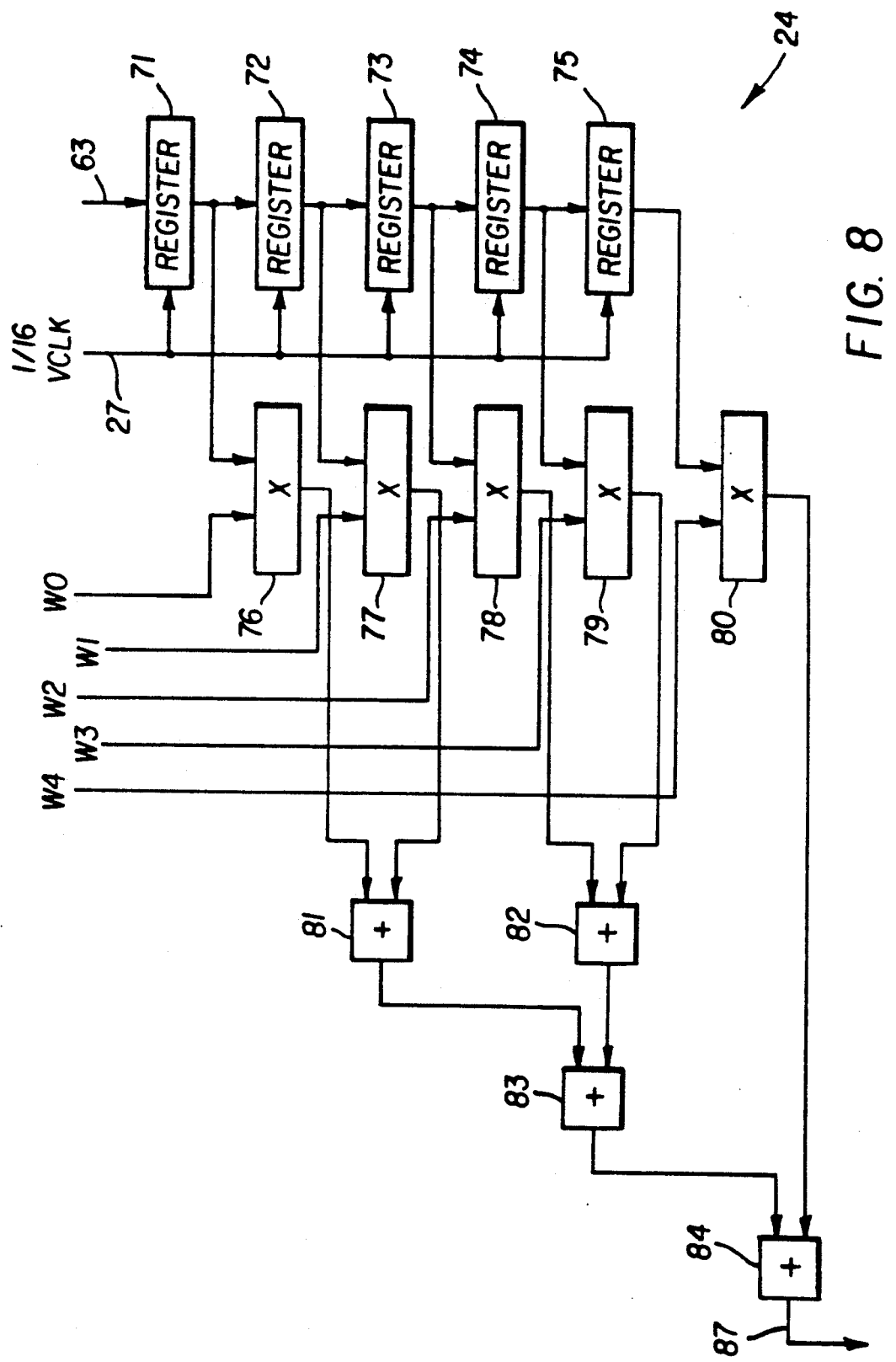
FIG. 8 is a schematic diagram showing details of the convolution integrator circuit used in the image scanner as shown in FIG. 3.

FIG. 8 shows details of part of the convolution integrator 24. This circuit is provided with a series of five registers 71 to 75. The 1/16-pixel clock signal on signal line 27 is input to the clock terminal of each of these registers. The output side of each of the registers is connected to an input terminal of corresponding multipliers 76 to 80. Sequence data items W0 to W4, termed a window function, are input to the other input terminal of the corresponding multipliers 76 to 80. This window function determines the transmission characteristics of a filter, and is set to the particular value needed to attain an objective.

The output sides of multipliers 76 and 77 are connected to a first adder 81 and the output sides of multipliers 78 and 79 are connected to a second adder 82. The output sides of the first and second adders 81, 82 are connected to a third adder 83, the output side of which is connected to one of the input terminals of a fourth adder 84. The other input terminal of the fourth adder 84 is connected to the output side of multiplier 80. The convolution integrator 24 is provided with five sets of this circuit arrangement.

The 4-line pixel total data 63 from the second line memory 53 of the rounding circuit 21 is input sequentially, synchronized by the 1/16-pixel clock signal, and is then given a 1-line delay (amounting to N pixels) by means of a line delay buffer (not shown) and input to the above respective five sets of circuits as the 16-pixel-average data for five lines (in FIG. 7, Y=0 to 4). Convolution is thus performed with respect to the 16-pixel-average data for five lines (FIG. 7, Y=0 to 4).

The following convolution operation is performed with respect to each line. The 16-pixel-average data input from the rounding circuit 21 is sequentially shifted to registers 71 to 75, and the multipliers 76 to 80 are then used to multiply the output of each of these registers by window function sequence data items W0 to W4, and the series of adders 81–84 are then used to obtain the sum 87 of the products.

The same processing is performed with the other four sets of circuits. The outputs of these circuits are added to each other by means of other adding circuits (not shown). Other multipliers (not shown) are used to multiply the outputs thus produced by a prescribed coefficient, and the resulting output is input to the subtracter 23 (FIG. 3) as data on signal line 85 indicating the average intensity of the surrounding pixels. This data is obtained as the result of a convolution operation in which the 400 pixels within the region 86 (indicated in FIG. 7 by the thick line) are treated as 25 pseudo pixels.

The difference between the data from the convolution integrator 24 and the image signal input directly from the A/D converter 18 is obtained by the subtracter 23. If this difference is above a certain level, it is judged that the pixel of interest is part of an alphanumeric character or symbol image pattern, and the following processing is performed.

Figure 1:
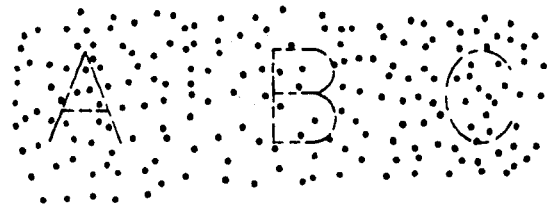
FIGS. 1 and 2 are diagrams showing the results obtained by scanning a document by several methods of the prior art.
Figure 2:
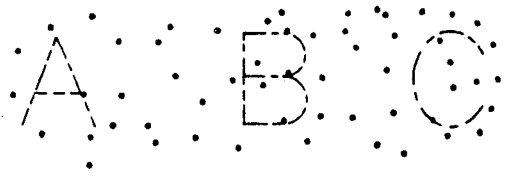
Figure 9:
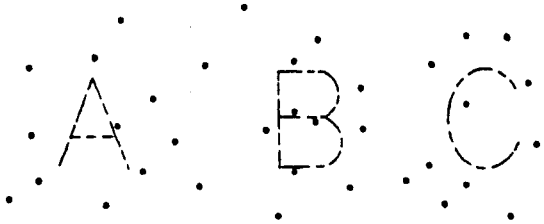
FIG. 9 is a diagram showing the results obtained by scanning a document using the image scanner as shown in FIG. 3.

FIG. 9 (C) was obtained by scanning a document with the image scanner 10 according to this embodiment of the invention. With the present invention it is possible to obtain an image quality that is substantially the same as or better than the quality of the example of FIG. 2. However, FIG. 2 is the result of performing convolution with respect to forty or more pixels, while FIG. 3 is the result of a convolution operation in which the 25-pixel groups of FIG. 7 are each regarded as a pseudo pixel, and these 25 pseudo pixels contain 400 pixels. In actual fact, therefore, it is possible to better suppress background noise because it is possible to obtain background intensity information over a larger area.

In the invention as described in terms of the above embodiment, rounding circuit 21 is used to obtain the average value after obtaining the total of the 16 pixels of each pixel group shown in FIG. 7. At the point at which pixels are totalled every four pixels along the primary scanning lines, after the least-significant two bits of the total data have been discarded to obtain the average value per four pixels, a four-line total is compiled. The least significant two bits of the four-line total are discarded to produce an average value per sixteen pixels.

In this embodiment of the invention, for each pixel of interest image data showing the average intensity of five 16-pixel pixel groups in both X and Y directions is extracted (FIG. 7) and convolution is performed with respect to this total of 25 data items. This is not however limitative; convolution may instead be performed with respect to a total of four data items, two in each of the X and Y directions. In this case the convolution circuit arrangement could be further simplified and the average intensity of 64 (i.e. 16×4) pixels around the pixel of interest obtained.

What is claimed is:

1. An image scanner comprising:
   an image sensor for receiving light reflected from or transmitted by a document and converting the light into a series of signals representing the light intensity for a plurality of image pixels;
   a rounder operatively connected to said image sensor for grouping respective signals for predetermined adjacent image pixels to form a predetermined series of pseudo pixels surrounding a predetermined image pixel and calculating an average light intensity value for each pseudo pixel;
   a convolution integrator operatively connected to said rounder for performing convolution operations on the average light intensity value for each pseudo pixel and generating an output signal therefrom; and
   a subtracter operatively connected to said image sensor and said convolution integrator for calculating the difference between the output signal of the convolution integrator and the light intensity value of the predetermined image pixel.

2. The image scanner according to claim 1 further comprising an analog to digital converter operatively connected between said image sensor and said rounder for converting the series of signals from said image sensor into a series of digital values for input to said rounder.

3. The image scanner according to claim 1 further comprising a clock circuit operatively connected to said rounder and said convolution integrator for providing clock signals thereto.

4. The image scanner according to claim 1 wherein said image sensor comprises a series of photosensors arranged in side-by-side relation in a first direction; and further comprising means for scanning said series of photosensors in a second direction transverse to the first direction over successive lines of the document.

5. The image scanner according to claim 4 wherein said rounder comprises:
   a series of registers for calculating a sum of light intensity values for a predetermined number of adjacent image pixels in the first direction; and
   a memory for storing the respective sums of light intensity values for the predetermined number of adjacent image pixels in the first direction for a predetermined number of successive lines scanned in the second direction.

6. The image scanner according to claim 1 wherein said predetermined series of pseudo pixels comprises about 25 pseudo pixels, and wherein each pseudo pixel contains about 16 individual image pixels.

7. The image scanner according to claim 1 wherein said convolution integrator includes means for convolving the average light intensity value for each pseudo pixel with a predetermined window function.

8. An image scanner comprising:
   an image sensor for receiving light reflected from or transmitted by a document and converting the light into a series of signals representing the light intensity for a plurality of image pixels arranged in two orthogonal directions;
   a rounder operatively connected to said image sensor for grouping respective signals for predetermined adjacent image pixels to form a predetermined series of pseudo pixels surrounding a predetermined image pixel and calculating an average light intensity value for each pseudo pixel, said rounder comprising
      a series of registers for calculating a sum of light intensity values for a predetermined number of adjacent image pixels in a first direction, and
      a memory for storing the respective sums for a predetermined number of successive lines of the document in the second direction;
   a convolution integrator operatively connected to said rounder for performing convolution operations on the average light intensity value for each pseudo pixel and generating an output signal therefrom; and
   a subtracter operatively connected to said image sensor and said convolution integrator for calculating the difference between the output signal of the convolution integrator and the light intensity value of the predetermined image pixel.

9. The image scanner according to claim 8 further comprising an analog to digital converter operatively connected between said image sensor and said rounder for converting the series of signals from said image sensor into a series of digital values for input to said rounder.

10. The image scanner according to claim 8 further comprising a clock circuit operatively connected to said rounder and said convolution integrator for providing clock signals thereto.

11. The image scanner according to claim 8 wherein said image sensor comprises a series of photosensors arranged in side-by-side relation in the first direction; and further comprising means for scanning said series of photosensors in the second direction over successive lines of the document.

12. The image scanner according to claim 8 wherein sd predetermined series of pseudo pixels comprises about 25 pseudo pixels, and wherein each pseudo pixel contains about 16 individual image pixels.

* * * * *